United States Patent [19]

Kiyono

[11] Patent Number: 5,008,957
[45] Date of Patent: Apr. 16, 1991

[54] MULTILEVEL OPTICAL SIGNAL TRANSMITTER

[75] Inventor: Mikio Kiyono, Tokyo, Japan

[73] Assignee: NEC Corporation, Japan

[21] Appl. No.: 318,710

[22] Filed: Mar. 3, 1989

[30] Foreign Application Priority Data

Mar. 3, 1988 [JP] Japan .................................. 63-48613

[51] Int. Cl.$^5$ ............................................. H04B 10/00
[52] U.S. Cl. .................................... 455/618; 455/608; 455/611
[58] Field of Search ............... 455/618, 608, 611, 613; 350/96.14

[56] References Cited

U.S. PATENT DOCUMENTS

| | | | |
|---|---|---|---|
| 3,383,460 | 5/1968 | Pritchard | 455/618 |
| 4,211,929 | 7/1980 | Tamburelli | 455/618 |
| 4,502,037 | 2/1985 | Le Parquier et al. | 350/96.14 |
| 4,507,775 | 3/1985 | Sheem | 455/611 |
| 4,743,087 | 5/1988 | Utaka et al. | 350/96.14 |
| 4,856,092 | 8/1989 | Wade | 455/608 |
| 4,871,223 | 10/1989 | Auracher et al. | 350/96.14 |

OTHER PUBLICATIONS

"Directional Coupler Switches, Modulators and Filters Using Alternating Techniques," by R. V. Schmidt and R. C. Alferness, IEEE Transactions on Circuits and Systems, vol. CAS-26, No. 12, pp. 1099-1108.

"32 Switch-Elements Integrated Low-Crosstalk LiNbO$_3$ 4×4 Optical Matrix Switch," by M. Kondo et al., Proceedings of International Conference '85, pp. 361-364.

*Primary Examiner*—Reinhard J. Eisenzopf
*Assistant Examiner*—Geoff Sutcliffe
*Attorney, Agent, or Firm*—Laff, Whitesel, Conte & Saret

[57] ABSTRACT

An optical signal transmitter controls the intensity of a light which is transmitted over an optical fiber. The transmitter splits a light beam into two substantially equal parts which pass through two separate paths in a LiNbO$_3$ substrate. The intensity of the light is separately switched back and forth between high and low intensities in response to binary electrical signals. At the output ends of the two paths, the signals are recombined and sent over an optical fiber. The resultant recombined signal is a three level signal of (a) the light in both paths at a low level, (b) the light in one path at a high level and in the other path at a low level, and (c) the light in both paths at a high level.

4 Claims, 1 Drawing Sheet

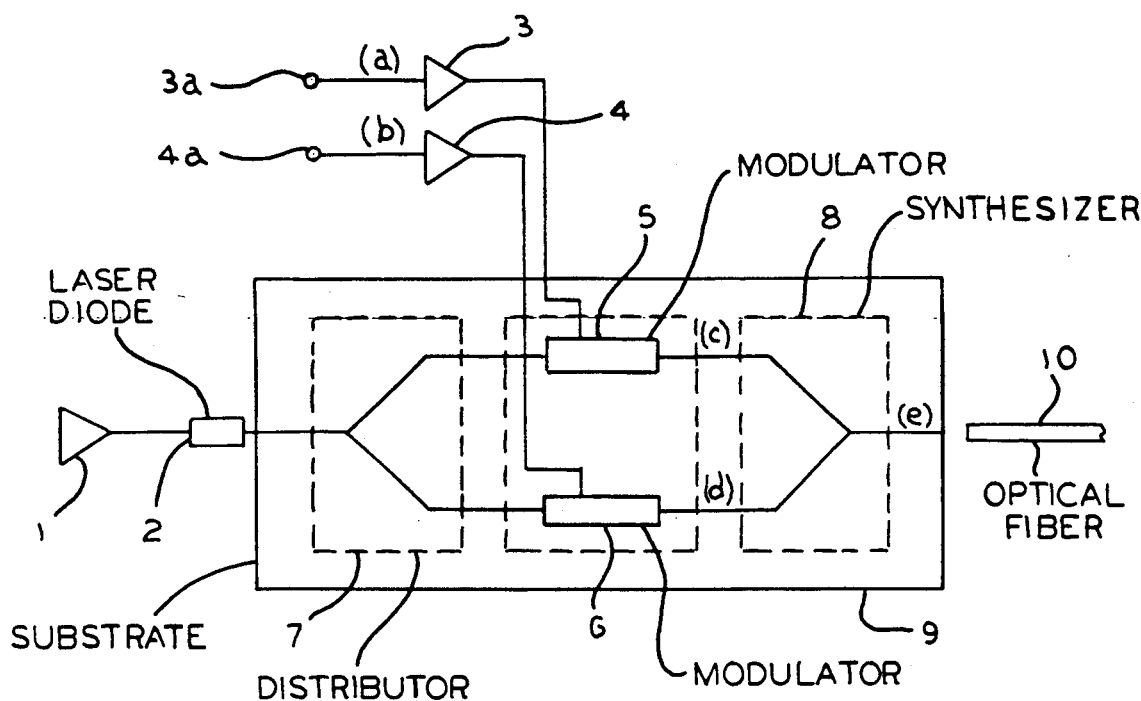
FIG. 1
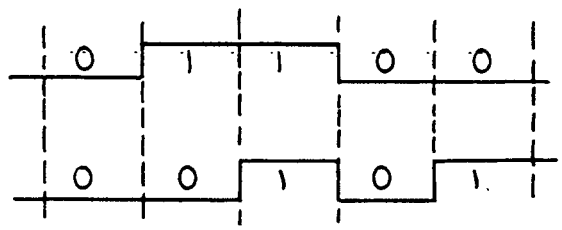
FIG. 2A (a)
FIG. 2B (b)
FIG. 2C (c)
FIG. 2D (d)
FIG. 2E (e)

MULTILEVEL OPTICAL SIGNAL TRANSMITTER

BACKGROUND OF THE INVENTION

The present invention relates to a multilevel optical signal transmitter.

A conventional optical communications system uses a multilevel optical signal generated by a conventional transmitter which comprises a laser diode or a light emitting diode (LED) which is driven by a multilevel driving current. Thus, a transmitter of this type transmits a multilevel optical signal having optical intensity levels. The intensity level of the optical signal is approximately proportional to the driving current. The difference between the intensity levels of adjacent ones of the optical signals will be hereinafter called a "level-to-level distance".

In the transmitter, it is difficult to make level-to-level distances equal to each other, because it is hard to precisely control the current level of the driving current and because the characteristics of the diode which is used fluctuates due to external factors, such as temperature. Consequently, it is not easy to construct a reliable optical communications system by merely resorting to the conventional transmitter.

An object of the invention is therefore, to provide a multilevel optical transmitter which is free from the above-mentioned disadvantages of the conventional transmitter.

SUMMARY OF THE INVENTION

According to an aspect of the invention, a multilevel optical transmitter comprises:
  luminous means for emitting a first optical signal of a constant intensity;
  modulating means for modulating the intensities of second optical signals by corresponding electrical modulating signals to produce intensity-modulated optical signals;
  distributing means for distributing the first optical signal given from the luminous means to the modulating means as the second optical signals; and
  synthesizing means for synthesizing the intensity-modulated optical signals from the modulating means into a multilevel optical signal.

BRIEF DESCRIPTION OF THE DRAWINGS

Other features and advantages of the invention will become apparent from the following description when taken in conjunction with the accompanying drawings in which:

FIG. 1 shows an embodiment of the invention; and
FIGS. 2A to 2E shown waveforms in various portions of the embodiment of FIG. 1.

DETAILED DESCRIPTION OF THE PREFERRED EMBODIMENT OF THE INVENTION

Referring to FIG. 1, an embodiment of the invention comprises a laser diode driving circuit 1, a laser diode 2, modulator driving circuits 3 and 4, a substrate 9 made of $LiNbO_3$, an optical waveguide-type distributor 7 formed on the substrate 9, optical waveguide-type modulators 5 and 6 formed on the substrate 9, an optical waveguide-type synthesizer 8 formed on the substrate 9, and an optical fiber 10.

Such an optical waveguide-type modulator formed on a substrate made of $LiNbO_3$ is described in an article entitled "Directional Coupler Switches, Modulators and Filters Using Alternating Techniques," by R. V. Schmidt and R. C. Alferness, published in IEEE Transactions on Circuits and Systems, vol. CAS-26, No. 12, pp. 1099-1108 (December 1979).

The optical waveguide-type distributor and the synthesizer mentioned above can be implimented by an optical matrix switch. A optical matrix switch formed on a substrate of $LiNbO_3$ is described in an article entitled "32 Switch-Elements Integrated Low-Crosstalk $LiNbO_3$ 4×4 Optical Matrix Switch," by M. Kondo et al., published in Proceedings of International Conference on Integrated Optics and Optical-Fiber Communication European Conference on Optical Communication '85, pp. 361-364 (1985).

A description will next be given of the operation of the embodiment.

The diode 2 is constantly maintained in its luminous state by the driving circuit 1. An optical signal from the diode 2 is applied to the distributor 7 on the substrate 9. The distributor 7 divides the applied optical signal into two optical signals of the same intensity which are then supplied to the modulators 5 and 6, respectively.

The modulators 5 and 6 modulate the supplied optical signals in response to modulating signals fed to input terminals 3a and 4a of the driving circuits 3 and 4, respectively. For examples, the modulating signals supplied to the circuits 3 and 4 are electrical binary signals (a) and (b) shown in FIGS. 2A and 2B, respectively. Each of the modulators controls the transmission of the optical signal supplied to its output terminal in accordance with levels of its electrical binary signal. Optical signals (c) and (d) are produced from the modulators 5 and 6, and are shown in FIGS. 2C and 2D. These signals are applied to the synthesizer 8, from which an optical signal (e) shown in FIG. 2E is supplied to the optical fiber 10. The intensity of the signal (e) is the sum of the signals (c) and (d). Therefore, the signal (e) is a ternary or three-level optical signal.

While this invention has been described in conjunction with the preferred embodiment thereof, it will now readily be possible for those skilled in the art to put this invention into practice in various other manners.

What is claimed is:

1. A multilevel optical signal transmitter comprising a substrate, a laser diode positioned to direct light into said substrate, distributor means on said substrate for directing said light into two separate paths, modulating means in each of said separate paths for controlling the intensity of light passing through the respective paths to be at either of two intensity levels, drive means associated with said modulating means for selectively switching said modulator to pass said light at a given one of said two intensity levels, and means for combining the switched light in said two paths for providing an optical output signal having instantaneous intensities which are sums of the instantaneous intensities of the light in said two paths, thereby providing a three level optical output signal.

2. The transmitter of claim 1 and optical fiber means for transmitting said optical output signal to a distant location.

3. The transmitter of claim 1 wherein said distributor divides said light into two signals of substantially equal intensity.

4. The transmitter of claim 3 wherein said drive means is operated responsive to binary electrical signals.

* * * * *